United States Patent
Widen

(10) Patent No.: US 7,405,815 B1
(45) Date of Patent: Jul. 29, 2008

(54) SYSTEMS AND METHODS FOR CHARACTERIZING LASER BEAM QUALITY

(75) Inventor: Kenneth C. Widen, Topanga, CA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 10/701,760

(22) Filed: Nov. 4, 2003

(51) Int. Cl.
    *G01J 1/00* (2006.01)
(52) U.S. Cl. ..................................... 356/121
(58) Field of Classification Search ......... 356/121–127, 356/212; 219/121.73; 372/6, 31; 702/28, 702/159
    See application file for complete search history.

(56) References Cited

U.S. PATENT DOCUMENTS

| | | | | |
|---|---|---|---|---|
| 4,910,690 A | * | 3/1990 | Fujita | 702/159 |
| 5,078,491 A | * | 1/1992 | Johnston, Jr. | 356/121 |
| 5,100,231 A | * | 3/1992 | Sasnett et al. | 356/121 |
| 5,124,993 A | * | 6/1992 | Braunlich et al. | 372/31 |
| 6,044,329 A | * | 3/2000 | Kidd | 702/28 |
| 6,549,092 B1 | * | 4/2003 | Hattori et al. | 333/134 |
| 6,606,158 B2 | * | 8/2003 | Rosenfeldt et al. | 356/477 |
| 7,128,737 B1 | * | 10/2006 | Goder et al. | 606/10 |
| 7,193,693 B2 | * | 3/2007 | Yazaki et al. | 356/30 |

* cited by examiner

*Primary Examiner*—Sang Nguyen
(74) *Attorney, Agent, or Firm*—Tom Chen; MacPherson Kwok Chen & Heid, LLP.

(57) ABSTRACT

A measure of the quality of a laser beam is obtained by comparing the power of a theoretical Gaussian beam through a (certain sized area) pinhole to the power of a test beam through a same sized (area) pinhole. The theoretical surrogate Gaussian beam with the same second moment of intensity as the test beam is used to determine the "bucket size" used in "power-in-the-bucket" techniques. The bucket size is an interaction area determined by the wavelength of the laser light, the focusing distance, and the $1/e^2$ radius of the near field intensity. The beam quality is determined by taking the square root of the ratio of the theoretical power through a bucket and the actual power through a pinhole with the same size as the bucket. The beam quality of different types of beam profiles can be obtained with a single method or measure.

20 Claims, 3 Drawing Sheets

SYSTEMS AND METHODS FOR CHARACTERIZING LASER BEAM QUALITY

STATEMENT REGARDING FEDERALLY SPONSORED RESEARCH OR DEVELOPMENT

This invention was made with Government support under contract number DASG60-00-C-0100 awarded by the U.S. Army. The Government has certain rights in this invention.

BACKGROUND

1. Field of the Invention

The present invention relates generally to lasers, and in particular, to characterizing the quality of laser beams.

2. Related Art

Laser beams are used today in a wide range of applications, ranging from eye surgery to the manufacture of semiconductor chips. The various applications typically require different types of lasers, such as solid state lasers, gas lasers, excimer lasers, dye lasers, and semiconductor or diode lasers. Also, depending on the type of laser and/or cavity, the generated beam can be classified by the type or profile, such as top hat, Gaussian, super Gaussian, and other transverse modes or combinations of transverse modes.

Another descriptor of laser beams is beam quality. In many applications, it is important to know something about the laser beam quality, i.e., how the beam departs from a theoretical perfect beam. The beam quality affects how the beam will propagate, as well as how tightly it will focus. Beam quality can worsen from a variety of factors, including misalignment, optics degradation, and laser deterioration. Therefore, with applications in which one needs to know how well the laser can focus the beam in a small interaction area, a measure of beam quality is desirable.

Unfortunately, it is often difficult to obtain a measure of beam quality, as evidenced in part by the numerous methods of determining beam quality. Some known methods include the $M^2$ parameter (space-beamwidth product), Strehl ratio, root-mean-squared (RMS) wavefront error or interferometry, and power-in-the-bucket (PIB). These methods all have advantages in some situations and deficiencies in other situations, such as the type of beam to be measured.

For example, the $M^2$ parameter has become a commonly used parameter to generally describe near-Gaussian laser beams. Most methods involve obtaining $M^2$ by measuring propagation distributions at multiple locations along the beam path. The $M^2$ parameter is especially useful in that it allows a prediction of the real beam spot size and average irradiance at any successive plane using simple analytic expressions. This provides system designers with the ability to know critical beam parameters at arbitrary planes in the optical system. However, when the laser beam shows any vignetting effects, e.g., from finite apertures, the $M^2$ measurement is not effective. Similarly, for other methods, such as in wavefront interferometry, a good coherence length and stabilized pointing is needed for proper determination of beam quality. Thus, present beam quality measurements are incomplete and inconsistent.

Accordingly, there is a need for a system and method of measuring the quality of laser beams which is suitable for many different types of beams.

SUMMARY

According to one aspect of the present invention, a measure of the quality of a laser beam is obtained by comparing the power of a theoretical Gaussian beam to that of a test beam using the same reference parameters. In one embodiment, power is measured through a pinhole or aperture the same size as a corresponding pinhole for the theoretical Gaussian beam. The area of corresponding beam diameters can also be measured by using a camera to count or determine the number of pixels within a given area. Any suitable camera may be used, such as a digital camera, with software and hardware to count or integrate the pixels within the specified area.

The beam quality, in one embodiment, is determined by taking the square root of the ratio of the power in the theoretical beam to that of the test beam. The farther the measured power deviates from the theoretical power, the lower the beam quality. The power is measured through a pinhole or bucket size (used in power-in-the-bucket techniques) having a diameter corresponding to the $1/e^2$ intensity at focus or the focal point of a transform lens. In this embodiment, the power measurement corresponds to the integrated intensity through the pinhole.

The beam quality can be determined for different types or profiles of laser beams, including Gaussian, top hat, super Gaussian, and combinations of transverse modes. All beams are compared to the lowest order Gaussian mode no matter how the beam is generated, which provides a standard reference to compare different types of beams. This allows a single system, as opposed to multiple systems, to be used for measuring beam quality for different beams. Further, a single system allows a universal measure of beam quality so that comparing the beam quality of different beams is much more easily accomplished.

According to one embodiment, the near field $1/e^2$ size $\omega_n$ of the beam under test at one focal length in front of the transform lens is determined. Using $\omega_n$, the focal length of the transform lens, and the wavelength of the light, the waist size at focus (i.e., far field) $\omega_f$ is calculated. The power of the test beam is measured through a pinhole having a diameter of $2\omega_f$. If this is not possible, then a series of power measurements are made through a variety of different size pinholes. These measurements are then normalized (by dividing by the power measured without a pinhole) and fit to a curve or plotted. Using the fit or plot, a normalized power can be obtained at the same bucket size or pinhole as the theoretical Gaussian beam. The beam quality is then determined by taking the square root of the ratio of 0.8647 (or $1-e^{-2}$) divided by the normalized measured power through the pinhole (or area). This technique is applicable for different types of laser beams and compares the test laser quality with the best possible focus available of beams having the same second moment of intensity.

This invention will be more fully understood in conjunction with the following detailed description taken together with the following drawings.

Embodiments of the present invention and their advantages are best understood by referring to the detailed description

DETAILED DESCRIPTION OF THE PREFERRED EMBODIMENTS

According to one aspect of the present invention, laser beam quality for different types of beams is determined by taking the square root of the ratio between the power in a theoretical Gaussian beam and the power in a test beam. In one embodiment, the power in the theoretical beam is determined from the lowest order Gaussian mode at the $1/e^2$ far-field intensity, i.e., at a relative power level of 0.8647. The power measurement of the test beam is through a pinhole, aperture, or opening of a size corresponding to an aperture size determined from the second moments of intensity of a test beam (or a Gaussian fit to test near field waist diameter). The determined second moments of the test beam are used to determine the $1/e^2$ size ($\omega_n$) of the theoretical Gaussian beam in the near field, where $\omega_n$ is the near-field waist spot size. The measured power is then normalized (divided by total power) to a relative ratio between 0 and 1. In one embodiment, the beam quality (BQ) is determined by taking the square root of 0.8647 divided by the relative measured power through a pinhole having a diameter two times $\omega_f$ (the far-field waist spot size, to be discussed below), as given by equation 1 below:

$$BQ = \sqrt{\frac{\left(\frac{\int_0^{2\pi}\int_0^{\omega_f} I_{theory}(r)rdrd\theta}{\int_0^{2\pi}\int_0^{\infty} I_{theory}(r)rdrd\theta}\right)}{\left(\frac{\int_0^{2\pi}\int_0^{\omega_f} I_{measured}(r)rdrd\theta}{\int_0^{2\pi}\int_0^{k\omega_f} I_{measured}(r)rdrd\theta}\right)}}$$

$$= \sqrt{\frac{0.8647}{\left(\frac{\int_0^{2\pi}\int_0^{\omega_f} I_{measured}(r)rdrd\theta}{\int_0^{2\pi}\int_0^{k\omega_f} I_{measured}(r)rdrd\theta}\right)}} = \sqrt{\frac{0.8647}{PIB}} \qquad (1)$$

where PIB is the measured power using the power-in-the-bucket (PIB) method. For a Gaussian beam, the intensity is given as follows:

$$I_{theory}(r) = \frac{2P}{\pi\omega_f^2}\exp\left[-2\left(\frac{r}{\omega_f}\right)^2\right] \qquad (2)$$

where P is the power, $\omega_f$ is the far-field waist size radius, and r is the distance. The evaluation of the numerator in equation (1) is from the well-known $1/e^2$ far-field criterion. The BQ number of equation (1) relates the square root of the ratio of power collected in an area of a perfectly focused Gaussian beam to the test beam. A beam quality of 1 corresponds to a "perfect" beam, with higher BQ numbers associated with lower quality beams.

Figure 1:
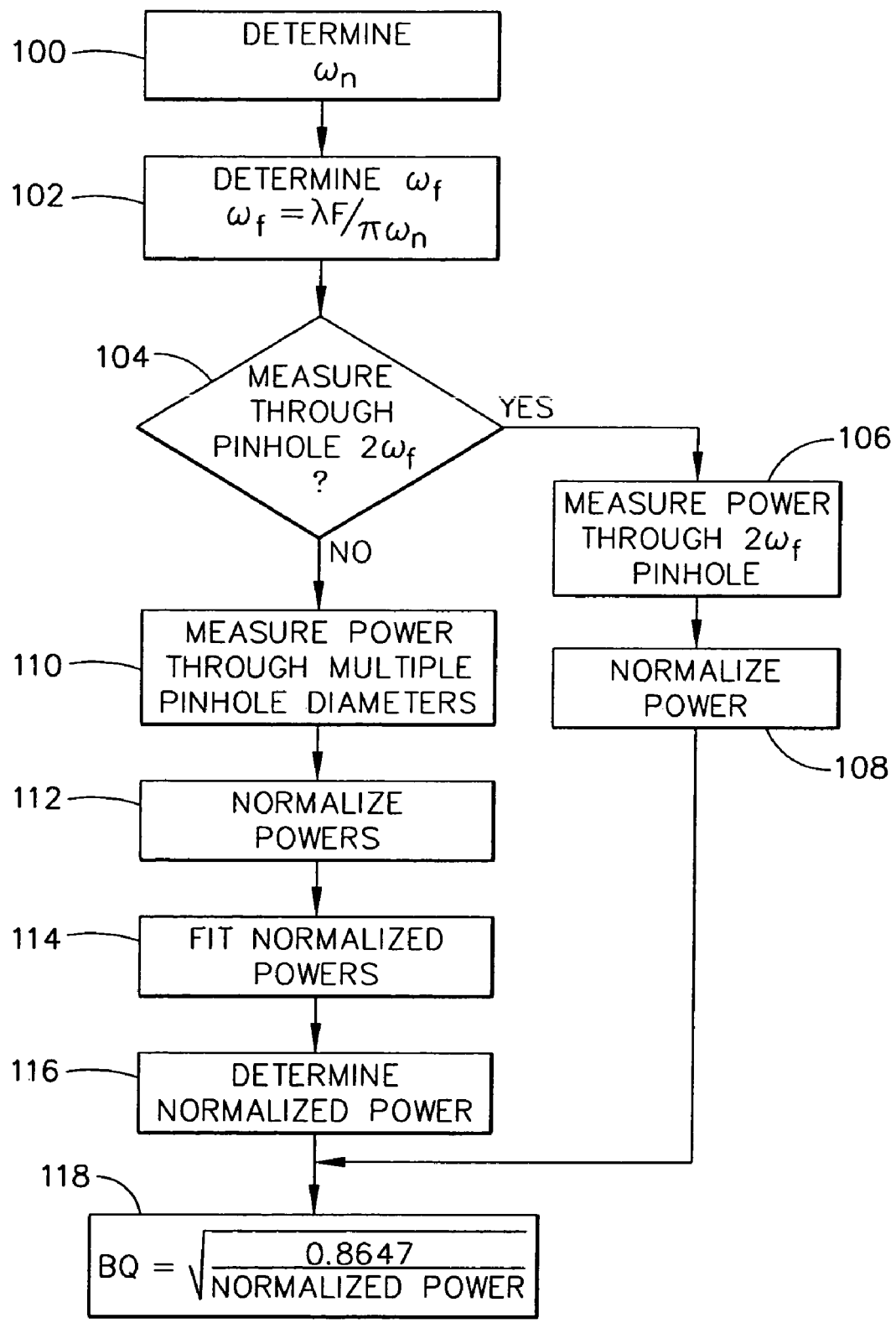
FIG. 1 is a flow chart showing a process of determining beam quality according to one embodiment of the present invention.

FIG. 1 is a flow chart showing a process of determining beam quality of a laser beam (the test beam) according to one embodiment. In step 100, the near-field waist spot size $\omega_n$ is determined for the test beam using a second moment of intensity to determine the $1/e^2$ size or using a fit to Gaussian. In one embodiment, the near-field spot size $\omega_n$ is obtained at one focal length in front of the transform lens by any suitable method, such as scanning across a knife or reference edge with a photodetector positioned behind or using a camera to determine the diameter of the beam. A fit to Gaussian or second moment can also be used. After the near-field spot size $\omega_n$ is determined, the far-field waist size $\omega_f$ is calculated in step 102 according to the following equation:

$$\omega_f = \frac{\lambda * F}{\pi * \omega_n} \qquad (3)$$

where $\lambda$ is the wavelength of the laser, F is the focal length of the transform lens, and $\omega_n$ is the near-field waist size radius.

Once the far-field waist size $\omega_f$ radius is obtained, a determination is made in step 104 as to whether a measurement is possible through a pinhole of diameter $2\omega_f$. If this is possible, e.g., a pinhole having the exact or very similar size is available, the power at one focal length from the transform lens is measured through the pinhole in step 106, such as with a conventional detector or power meter behind the pinhole. The measured power is then normalized in step 108 by dividing the power measured through the pinhole with the power measured without going through a pinhole. In one embodiment, the power measurements are called power-in-the-bucket (PIB) values, i.e., percentage of beam power in the main or central lobe and not in the wings.

If no pinhole is available with a diameter of approximately $2\omega_f$, as determined in step 104, then a series of measurements are made at one focal length behind the transform lens through pinholes of varying diameters, in step 110. A series of measurements through pinholes having diameters both less than and greater than $2\omega_f$ allows an approximation to be made. In one embodiment, measurements are taken through at least three different sized pinholes, although other numbers that allow an adequate approximation to be made may also be suitable. At a minimum, two measurements may be suitable for some applications; however, with only two measurements, the fit will be a linear fit and accuracy may be reduced. Once the measurements are made, the values are normalized by dividing by the measured power without going through a pinhole, in step 112. The normalized values are then plotted or fitted, such as to a third order polynomial, in step 114. The normalized PIB through a pinhole diameter of $2\omega_f$ is then determined by the plotted or fitted data, such as by extrapolation, in step 116.

Once the normalized power is determined, the square root of the fractional power (0.8647) of a theoretical Gaussian beam through a pinhole diameter of $2\omega_f$ divided by the measured or estimated measured power of the test beam through a pinhole diameter of $2\omega_f$ is calculated in step 118. This number is a measure of the beam quality of the test beam. A "perfect" beam would yield a measured normalized power of 0.8647 (or $1-e^{-2}$) for a beam quality value of 1.0. With a less than perfect beam quality, there will be less than 86% of the beam energy through the $2\omega_f$ waist size pinhole. With smaller normalized power values, the beam quality indicator increases. Therefore, higher numbers correspond to increasingly lower quality beams.

Figure 2:
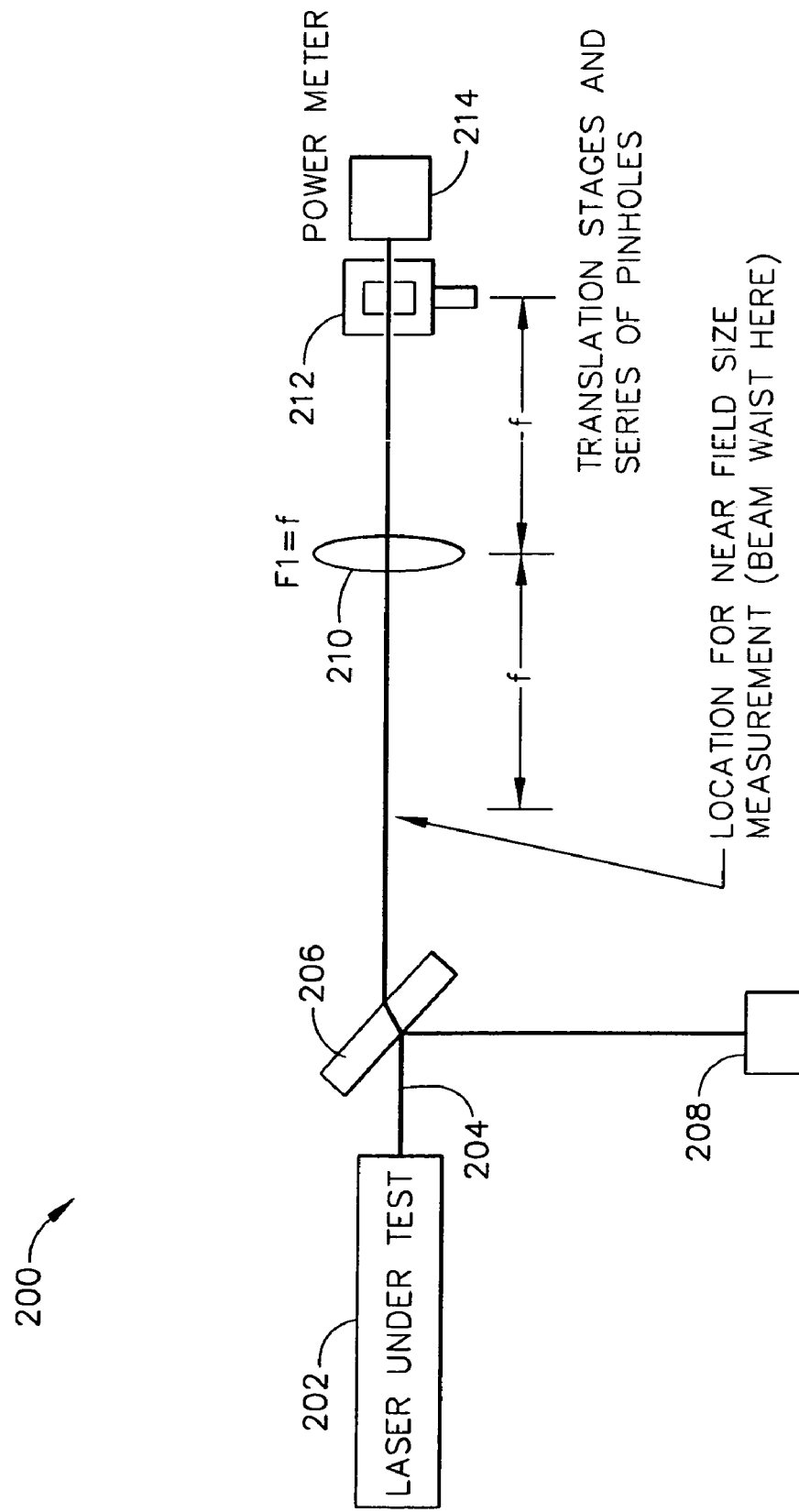
FIG. 2 is a block diagram of a system for measuring the power used in determining the beam quality according to one embodiment of the invention.

FIG. 2 shows a diagram of a system 200 for measuring the power used in determining the beam quality according to one embodiment of the invention. System 200 includes a laser 202 that generates a test beam 204. Laser 202 is not limited to any one type of laser, but may be selected from different types of lasers, such as, but not limited to solid state lasers, gas lasers, excimer lasers, dye lasers, and semiconductor or diode lasers. Similarly, test beam 204 can be different types of beams, such as, but not limited to Gaussian, super Gaussian, top hat, and different combinations of transverse modes. Test beam 204 impinges on a beam splitter 206 that directs a portion of the beam to a power meter reference 208 used to normalize laser power fluctuations during measurements, with another portion of the beam passing through beam splitter 206 toward a transform lens 210 with focal length f. Located one focal length in back of transform lens 210 is a test area 212, where the various sized pinholes are placed for the power measurement. Test area 212 may include an apparatus that transfers opaque sheets with various size pinholes used for the power measurements. A power meter 214 is positioned directly behind test area 212 to measure the power out of a pinhole.

Processors, calculators, or other suitable devices can then be used to process the measured values to obtain the beam quality. For example, a processor that runs a program implementing, e.g., the steps in FIG. 1, can receive the measured data and execute the steps to determine the beam quality. In addition, a machine-readable medium, such as a semiconductor memory or storage disk, can be used to store instructions to execute the operations for determining beam quality according to the invention, e.g., as shown in FIG. 1. The machine-readable medium can then be accessed (or read) by a processor or other machine which then executes the instructions to obtain the beam quality value. Such processors (not shown) can be coupled to power meter 214 of FIG. 2 to allow the processor to access measurement values from power meter 214 in order to execute the operations needed for determining the beam width quality. Further, a processor may be configured to receive a machine-readable medium, for example, a computer with a disk drive that allows the medium to be read and used by the computer.

EXAMPLE

In FIG. 2, assume laser 202 is a solid state Yb:YAG laser and laser beam 204 is a beam that is a combination of transverse modes with a wavelength of 1.03 microns. Transform lens 210 has a focal length f or F of 1 meter. The near-field waist or spot size $\omega_n$ is approximately 2.35 mm at one focal length or one meter in front of transform lens 210, as determined from step 100 of FIG. 1. The near-field waist size $\omega_n$ is then transformed to a corresponding far-field waist size $\omega_f$ according to equation (3) above. With λ approximately 1.03× $10^{-6}$ m, F approximately 1 m, and On approximately 2.35× $10^{-3}$ m, $\omega_f$ is equal to approximately 139.5 microns. A series of six power measurements are then made through pinholes having diameters of 100, 200, 300, 500, 600, and 1000 microns, along with a power measurement without a pinhole. The measured powers are shown in Table 1 below:

TABLE 1

| Pinhole diameter (μm) | Power Measurement (mW) |
|---|---|
| No pinhole | 323 |
| 1000 | 248 |
| 600 | 198 |
| 500 | 182 |
| 300 | 140 |
| 200 | 89 |
| 100 | 30 |

Figure 3:
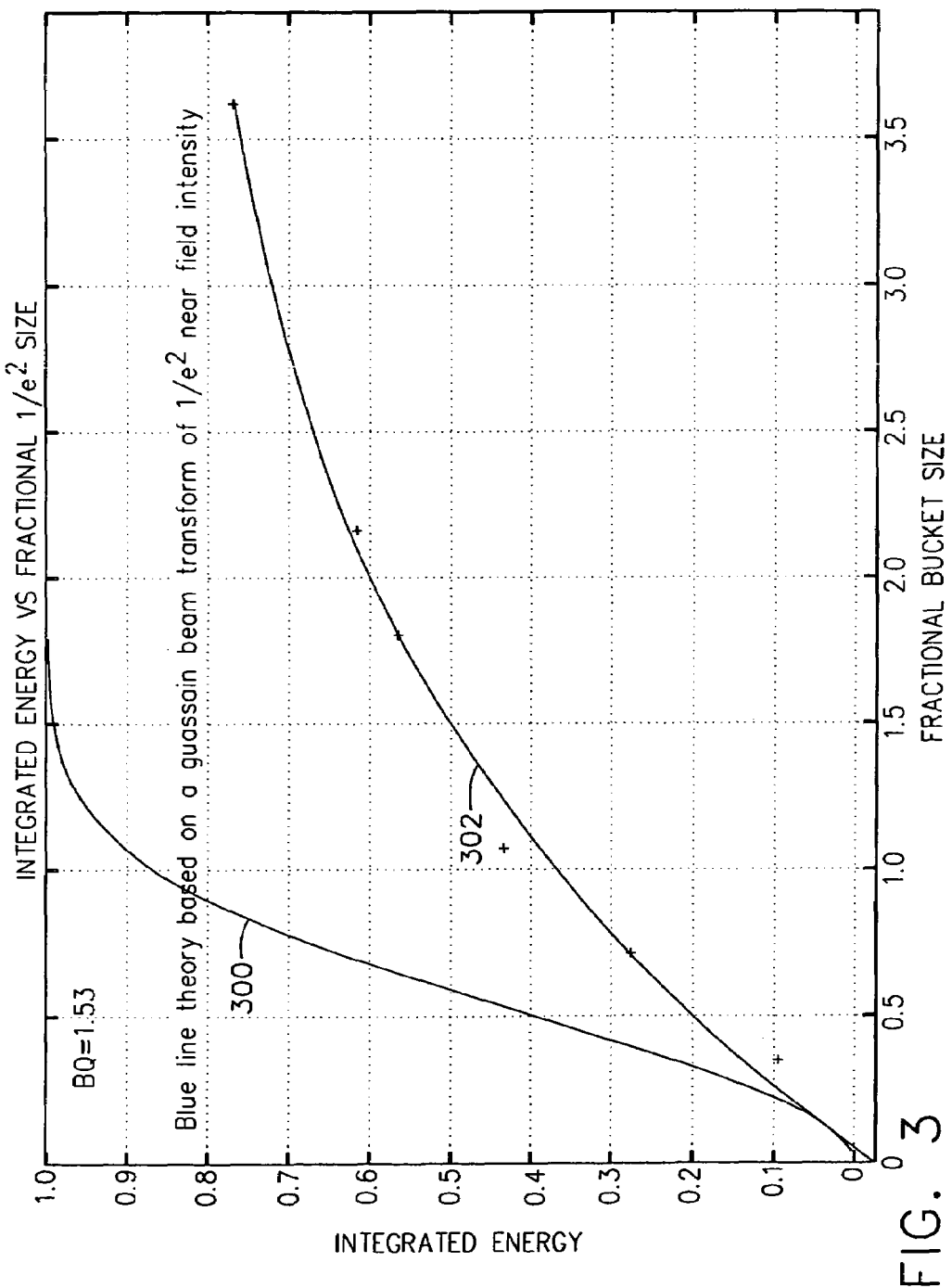
FIG. 3 is a graph showing a curve of normalized power measurements and a curve of theoretical values, according to one example, for determining beam quality.

The pinhole or "bucket size" is normalized with the bucket size of the diameter $2\omega_f$ at $1/e^2$ of the theoretical Gaussian beam, i.e., the pinhole diameter is divided by $2\omega_f$, resulting in fractional bucket size values. The power measurements are also normalized by dividing the measured power through the pinhole with the measured power without a pinhole. The numbers are then fit to a third order polynomial and plotted, as shown in FIG. 3. Line 300 represents the theoretical value or a "perfect" beam, while line 302 represents the measured test beam. At a fractional bucket size of 1 (corresponding to the $1/e^2$ waist size), theoretical line 300 shows a normalized integrated energy or power of 0.8647. With the test beam of this example, the fractional bucket size of 1 corresponds to a normalized power of 0.3695. This results in a beam quality of 1.53 ($[0.8647/0.3695]^{1/2}$).

One of the advantages of the present invention is that it allows a single method to measure beam quality for many or all different types of beams, thereby providing a standard reference to compare beam quality across different beams. Currently, different methods are used to measure beam quality for different beams, which makes it hard to compare and contrast beam qualities with different beams. Table 2 below shows sample values obtained using the method of the present invention to measure beam quality compared to the $M^2$ method.

TABLE 2

| Beam Profile | BQ (present invention) | $M^2$ |
|---|---|---|
| Gaussian | 1 | 1 |
| Top Hat | 1.1827 | >4 |
| Doughnut | 1.8234 | 2 |
| Doughnut with linear polarization | 1.0440 | 1.4362 |

Table 2 shows that the beam quality measurement of the present invention can be used to determine the BQ of different types of beams and still yield useful and accurate results. This is in contrast to conventional beam quality techniques, which do not produce accurate results for certain types of beams. For example, as shown in Table 2, the beam quality measurement using the $M^2$ technique yields an $M^2$ value greater than 4 for a top hat beam profile, while the beam quality measurement of the present invention gives a BQ value of 1.1827, which is a much more accurate representation of the quality of a top hat beam.

The above-described embodiments of the present invention are merely meant to be illustrative and not limiting. It will thus be obvious to those skilled in the art that various changes and modifications may be made without departing from this invention in its broader aspects. For example, values obtained by taking the square root of the ratio of theoretical power to normalized measured power is described above. However, other quantities for determining beam quality according to the present invention may also be suitable, such as taking powers of the ratio other than a square root and using pinholes with diameters other than $2\omega_f$. Therefore, the appended claims encompass all such changes and modifications as fall within the true spirit and scope of this invention.

What is claimed is:

1. A method of determining beam quality (BQ) of a laser beam, comprising:

determining a first measured value of the laser beam based on the power of a first portion of the laser beam;

determining a second measured value of the laser beam based on the power of a second portion of the laser beam;

calculating a normalized measured value by comparing the second measured value to the first measured value;

providing a reference value from a theoretical Gaussian laser beam;

calculating beam quality of the laser beam by comparing the normalized measured value with the reference value; and storing data related to the calculated beam quality in a storage medium.

2. The method of claim 1, wherein the reference value is approximately $1-e^{-2}$.

3. The method of claim 1, wherein determining the second measured value comprises measuring the power from the laser beam through an opening having a first diameter corresponding to twice the far-field waist size $\omega_f$ of Gaussian laser beam.

4. The method of claim 3, wherein calculating a normalized measured value comprises normalizing the measured power of the laser beam.

5. The method of claim 4, wherein determining the first measured value comprises measuring the power from the laser beam without an opening, and wherein normalizing the measured power comprises dividing the measured power of the laser through the opening by the measured power of the laser beam without an opening.

6. The method of claim 1, wherein determining comprises:
measuring power from the laser beam through a plurality of openings having different diameters;
normalizing the measured powers; and
determining the second measured value from the normalized measured powers.

7. The method of claim 6, wherein the number of measured powers is at least three.

8. The method of claim 1, wherein the second measured value is measured approximately one focal length away from a transform lens.

9. The method of claim 1, wherein comparing the normalized measured value with the reference value comprises calculating the square root of the reference value divided by the normalized measured value.

10. The method of claim 1, wherein the second measured value corresponds to twice a square root of the second moment of intensity of the laser beam.

11. The method of claim 1, wherein the laser beam comprises at least two different types of laser beams.

12. The method of claim 11, wherein the different types of laser beams comprises at least two of Gaussian, top hat, super Gaussian, transverse modes, and combinations of transverse modes.

13. The method of claim 1, wherein the laser beam is selected from different types of laser beams including at least one of Gaussian, top hat, super Gaussian, transverse modes, and combinations of transverse modes.

14. The method of claim 1, further comprising splitting the laser beam into a first test beam and a second test beam.

15. The method of claim 14, wherein the first portion of the laser beam comprises the first test beam, and wherein determining the first measured value is based on the power of the first test beam.

16. The method of claim 14, wherein the second portion of the laser beam comprises the second test beam, and wherein determining the second measured value is based on the power of the second test beam.

17. The method of claim 1, wherein comparing the second measured value to the first measured value comprises dividing the second measured value by the first measured value.

18. A machine-readable medium storing instructions executable by a processor for determining a measure of quality of a laser beam, the instructions having operations comprising:

splitting the laser beam into a first test beam and a second test beam;

determining a first measured value based on the power of the first test beam;

determining a second measured value based on the power of the second test beam;

calculating a normalized measured value by comparing the second measured value to the first measured value;

providing a reference value from a theoretical Gaussian laser beam;

calculating beam quality of the laser beam by comparing the normalized measured value with the reference value; and storing data related to the calculated beam quality in a storage medium.

19. The medium of claim 18, wherein the reference value is approximately $1-e^{-2}$.

20. The medium of claim 18, wherein the laser beam comprises at least two different types of laser beams.

* * * * *